US007716665B2

(12) United States Patent
Buehler et al.

(10) Patent No.: US 7,716,665 B2
(45) Date of Patent: May 11, 2010

(54) SYSTEM AND METHOD FOR DEVELOPING PORTAL APPLICATIONS AND FOR AUTOMATICALLY DEPLOYING PORTAL APPLICATIONS INTO A PORTAL SERVER APPLICATION

(75) Inventors: Dieter Buehler, Tuebingen (DE); Stefan Hepper, Boeblingen (DE); Thomas Schaeck, Achern (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/189,565

(22) Filed: Jul. 26, 2005

(65) Prior Publication Data

US 2006/0036993 A1 Feb. 16, 2006

(30) Foreign Application Priority Data

Aug. 16, 2004 (EP) ................................. 04103922

(51) Int. Cl.
*G06F 9/445* (2006.01)
*G06F 9/44* (2006.01)
*G06F 15/16* (2006.01)

(52) U.S. Cl. ................. 717/175; 717/177; 719/328; 719/329; 709/250

(58) Field of Classification Search ................. None
See application file for complete search history.

(56) References Cited

U.S. PATENT DOCUMENTS

| 6,892,382 | B1 * | 5/2005 | Hapner et al. ............. 717/174 |
| 6,986,135 | B2 * | 1/2006 | Leathers et al. ............ 717/177 |
| 7,165,249 | B2 * | 1/2007 | Potter et al. ............... 717/174 |
| 2003/0172129 | A1 * | 9/2003 | Moses et al. ............... 709/219 |
| 2005/0257217 | A1 * | 11/2005 | Woollen .................... 717/177 |
| 2006/0020908 | A1 * | 1/2006 | Jain et al. .................. 717/101 |

OTHER PUBLICATIONS

Hepper et a;., Introducing the Portlet Specificiaiton, Part 1, published on JavaWorld, Aug. 2003, [retrieved online from http://www.javaworld.com/javaworld/jw-08-2003/jw-0801-portel.html on Dec. 11, 2008].*
BEA WebLogic Portal Deploying Portal Applicaitons, Version 8.1 with Service Pack 2, document Revised Feb. 2004. pp. 1-52.*
Endrel et al., IBM WebSphere V4.0 Advanced Edition Handbook, chapter 20, "Packaging and deploying Web services"; Chapter 19, "Deploying an application" page published on Mar. 2002, pp. 687-738.*

(Continued)

*Primary Examiner*—Tuan Q Dam
*Assistant Examiner*—Zheng Wei
(74) *Attorney, Agent, or Firm*—Raymond Szeto; Hoffman Warnick LLC (57) ABSTRACT

The present invention provides a system and method for developing a Portal Application by creating a Portal Application Archive, and automatically deploying the Portal Application Archive into a Portal Server Application by using a Portal Application Archive specific deployment mechanism. The Portal Application Archive represents an entity which includes an assembly of all required application components forming a coherent Portal Application, and an application component assembly descriptor which specifies how the single application components need to be assembled to provide the complete Portal Application on the Portal Server Application.

12 Claims, 10 Drawing Sheets

OTHER PUBLICATIONS

John Methot, WebLogic Workshop Internals, WebLogic Workshop 8.1, Feb. 17, 2004, pp. 1-31.*

European Search Report, Application No. 05105889.9-2201, pp. 1-4, Completion Date Apr. 5, 2006.

Anonymous: "Introduction to JSR 168—The Java Portlet Specification", Jul. 23, 2004, pp. 1-18, XP002375680, http://developer.sun.com.

Anonymous: "Jetspeed—Portal Structure Markup", Feb. 17, 2004, pp. 1-13, XP002375681, http://web.archive.org/web/20040217104646/http://jakarata.apache.org/jetspeed/site/psm1.html.

R. Lynn, "Hello World, the simplest portlet for WebSphere Portal V5: Part 2. Rendering with JSP", Mar. 31, 2004, pp. 1-11, XP002375682, http://www-128.ibm.com/developerworks/websphere/library/techarticles/0403_lynn2/0403_lynn2.ht.

* cited by examiner

SYSTEM AND METHOD FOR DEVELOPING PORTAL APPLICATIONS AND FOR AUTOMATICALLY DEPLOYING PORTAL APPLICATIONS INTO A PORTAL SERVER APPLICATION

BACKGROUND OF THE INVENTION

1. Field of the Invention

The present patent application relates to a system and method for developing Portal Applications and for automatically deploying Portal Applications into a Portal Server Application.

2. Background of the Invention

A Portal Server Application provides a flexible framework to produce very complex web sites with very little effort. The basic functional units of a Portal Server Application are Portlets. Portlets can be considered as building bricks to create complex web sites with sophisticated features. The Portal Server Application aggregates the output of the individual Portlets to an output which can be rendered in a browser. This aggregation of content is a key feature of Portal Server Applications, since it integrates the user interface (UI) of independent Portlets nicely without the need to write any integration code.

Each Portlet is a standalone unit of code, which gets compiled, packaged and installed independently. This is very advantageous when integrating Portlets/Content from very different Providers into a homogeneous web site. There is virtually no integration effort. The administrator of the Web Server installation will install each desired Portlet individually and arrange the layout of the Portlet when designing the web site.

A disadvantage of this concept arises when a complex Portal Application comprises more than one Portlet. For instance an Online Banking Application could have many multiple Portlets, for example an Account Portlet, a Stock Price Portlet, a Stock Purchase Portlet, Email Portlet, a Loan Portlet, and a Mortgage Portlet (see FIG. 1A).

Typically these Portlets can be developed and provided by the application developer as part of a consistent Portal Application. Unfortunately the Portal Application developer cannot ship the Portal Application as a single coherent unit to his customers. Instead he needs to ship his Portal Application as individual pieces or so called Portlets. At the customer's site (Portal Server Application), each of the required Portlets of the Portal Application needs to be installed and assembled individually one after each other. The administrator must perform all these installation steps for each Portlet and also finally define how the Portlets should be arranged in the web site layout. The installation of complex Portal Applications becomes a very challenging and difficult task.

This problem becomes more significant as the features of Portals increase: Portal Applications, which are developed for that platform, take advantage of new capabilities and their complexity is growing as well. Modern Portal Applications comprise more than just a couple of Portlets. Further components can be added to produce even more sophisticated J2EE applications. A complex vertical J2EE application comprises manifold base J2EE component types as well as many Portal specific components types, which are all sewed together to a coherent Portal Application produced by a large application development team.

SUMMARY OF THE INVENTION

It is object of the present invention to provide a new system and method for developing a Portal Application and for deploying the Portal Application into a Portal Server Application environment that avoids the disadvantages of the prior art.

In this patent application all components which make up a Portal Application are covered by the term "application components." Such application components may be, for instance, individual Portlet Applications (e.g., embedded as WAR-Files, Code+XML), Layout Design (e.g., Themes & Skins), Portlet Filters (Code+XML), Access Control Definitions and Roles (XML), Dynamic Assembly Modules/Conditions as special case (e.g., Code+XML), Page/Navigation Definitions (e.g., XML), URL Mappings (e.g., XML), Documents (e.g., XML Metadata+binary), Enterprise Java Beans, JCA Connectors (e.g., embedded as JAR-Files), Servlets (e.g., embedded as WAR Files), Portlet Utility Services, Included Web Services, Inter Application Communication Definitions (e.g., "Click-2-Action"), and JSF Components.

The present invention provides a system and method for developing a Portal Application by creating a Portal Application Archive, and automatically deploying the Portal Application Archive into a Portal Server Application using a Portal Application Archive specific deployment mechanism. The Portal Application Archive represents an entity which includes an assembly of all required application components forming a coherent Portal Application, and additionally an application component assembly descriptor which specifies how the single application components need to be assembled into the complete Portal Application on the Portal Server Application environment. The Portal Application Archive is provided to the Portal Server environment and is automatically deployed into the Portal Server Application environment using a Portal Application Archive specific deployment mechanism. The deployment mechanism evaluates the application component assembly descriptor information and applies that information to the deployment process. The present invention allows the development of complete Portal Applications including pages, Portlets, communication channels between Portlets, etc., that can be deployed either out-of-the box or serve as a template that gets further customized at deployment time.

BRIEF DESCRIPTION OF THE DRAWINGS

The above, as well as additional objectives, features and advantages of the present invention will be apparent in the following detailed written description.

The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

DETAILED DESCRIPTION OF THE INVENTION

Figure 1A:
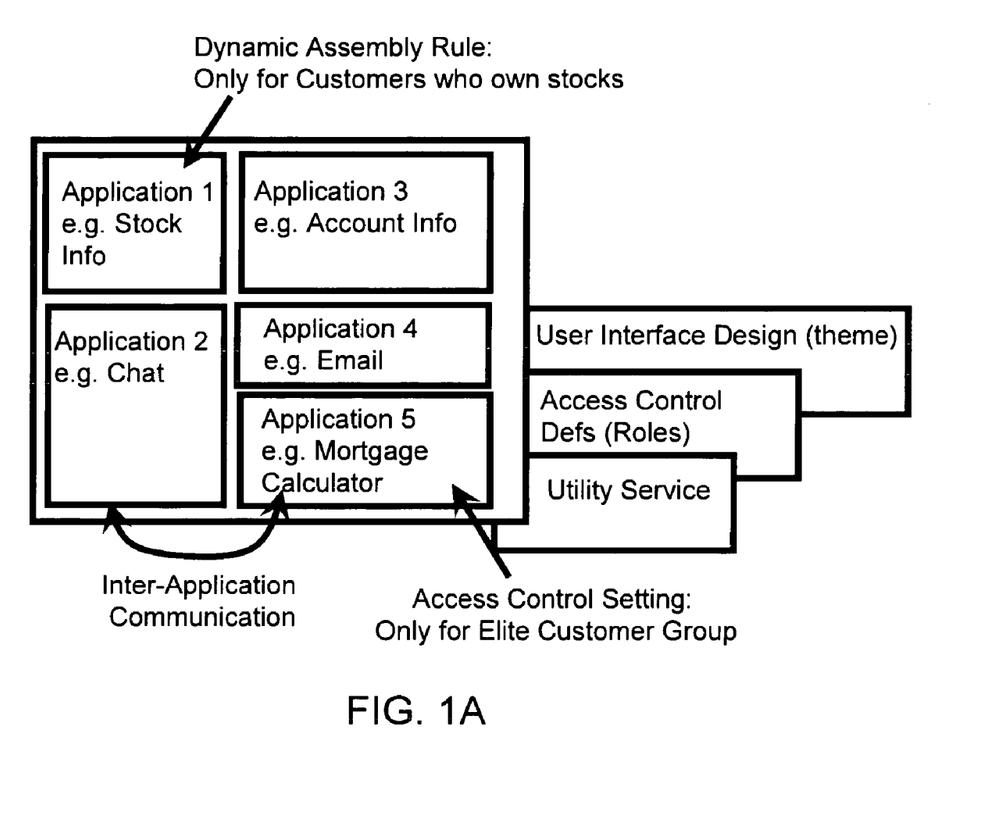
FIG. 1A shows an example of the structure of a Portal Application.

FIG. 1A shows an example of a complex Portal Application. The Portal Application (e.g., an Online Banking Application) includes multiple Portlets such as an Account Portlet, Stock Price Portlet, Stock Purchase Portlet, Email Portlet, Loan Portlet, Mortgage Portlet, etc.

Typically, these Portlets can be developed and provided by the application developer as part of a consistent application. However, the application developer cannot ship the application as a single coherent unit to the customer. Instead he needs to ship the application as individual Portlets. At the customer's side, each of the required Portlets needs to installed and assembled individually one after each other. The administrator must define all these installation steps and also finally define how the Portlets should be arranged on the web site layout. The installation of complex Portal Application becomes a very challenging and difficult task.

Figure 1B:
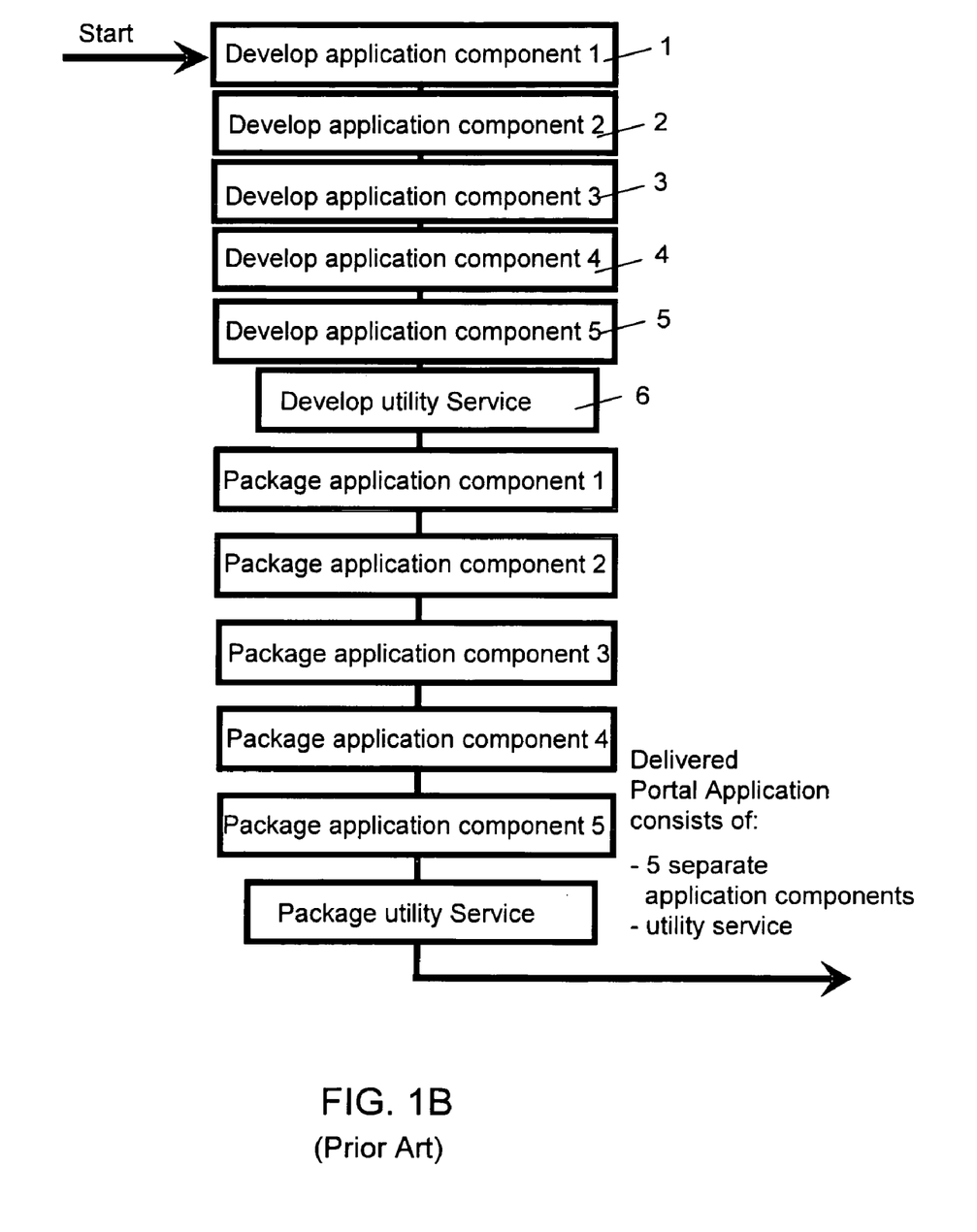
FIG. 1B shows a prior art development process of a Portal Application.

FIG. 1B shows a prior art development process of a Portal Application such as that shown in FIG. 1A.

Each application component 1-5 is developed and packaged individually. Typically, each of these packages is represented as a separate file, e.g., a WAR file.

The information which defines how the individual application components need to be assembled by the administrator at the customer's site into a Portal Application is normally provided by a user manual.

Figure 1C:
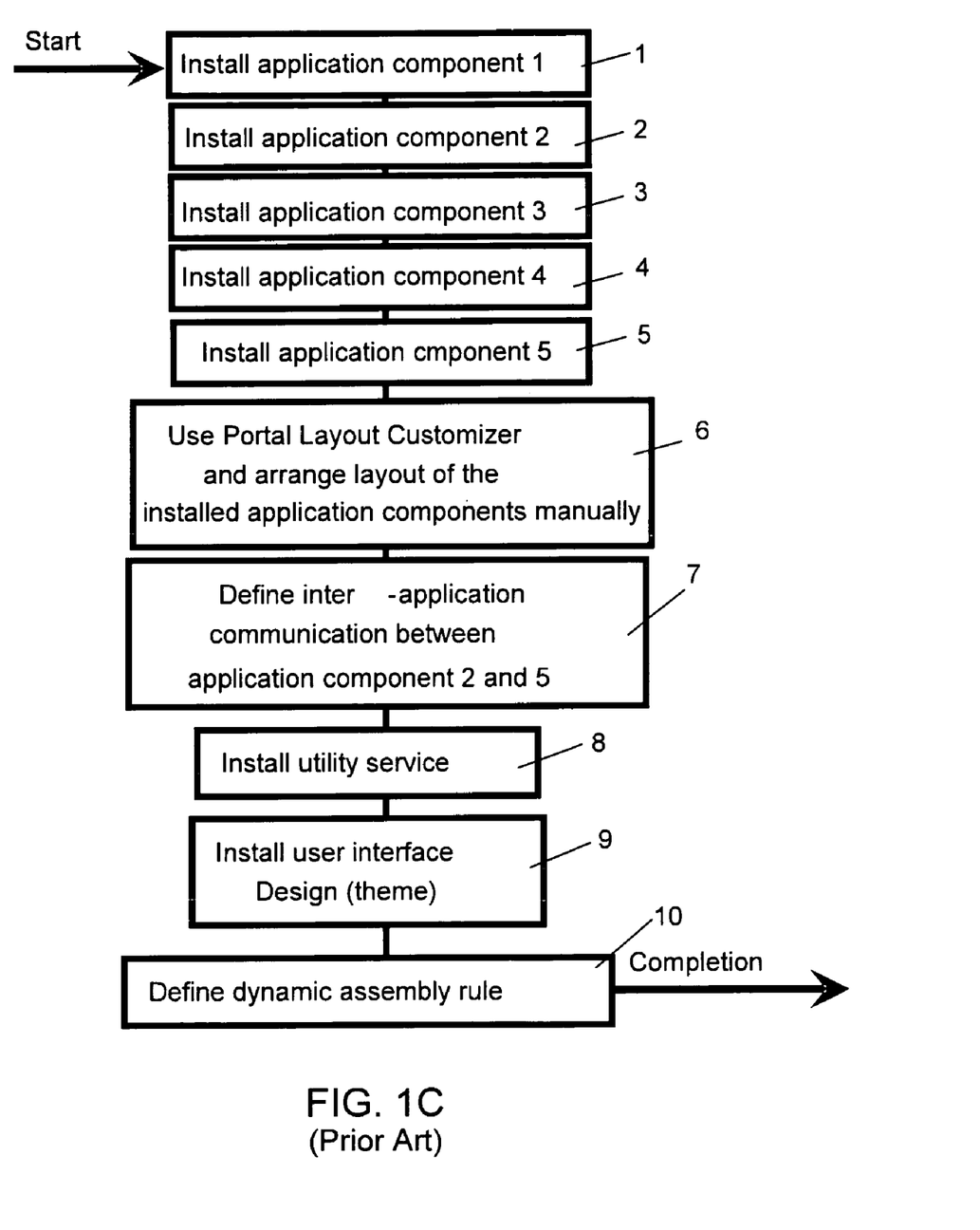
FIG. 1C shows a prior art deployment process of a Portal Application.

FIG. 1C shows a prior art deployment process of a Portal Application into a Portal Server Application environment.

In today's Portal Server Application environment, the administrator would have to install each application component 1-5 individually. After installation he has to customize the Portal Application by manually arranging the application components 1-5 as recommended by the application developer. Additional deployment steps could be the installation of certain services or the manual definition of interactions between application components.

Figure 2A:
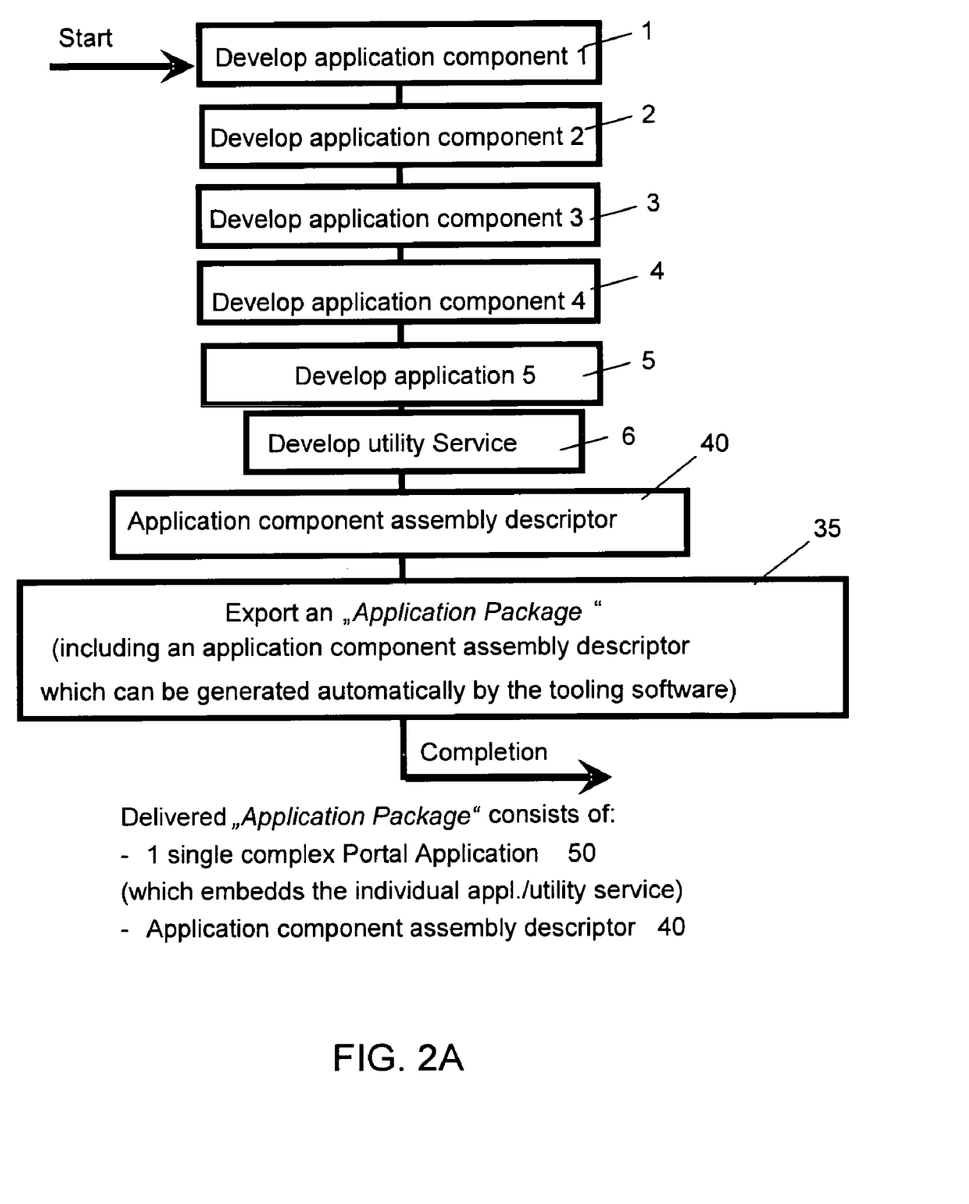
FIG. 2A shows the basic development process of a Portal Application according to the present invention.

FIG. 2A shows the basic development process of a Portal Application as shown in FIG. 1A according to the present invention.

The present invention teaches that all individual application components 1-5 are stored and/or packaged together as an entity (e.g., a single Java EAR File, a set of correlated files, a database record, etc.), which includes all individual application components 1-5 forming a coherent Portal Application. The Tooling Software defines meta information which includes interactions between the application components 1-5 as well as the desired layout of the entire Portal Application. Based on this meta information the Tooling Software can generate a machine-readable application component assembly descriptor 40 for the entire Portal Application and package it together with the application components 1-5 as an entity 35 called a Portal Application Archive. The content of the application component assembly descriptor 40 is shown in more detail in FIG. 4.

Figure 2B:
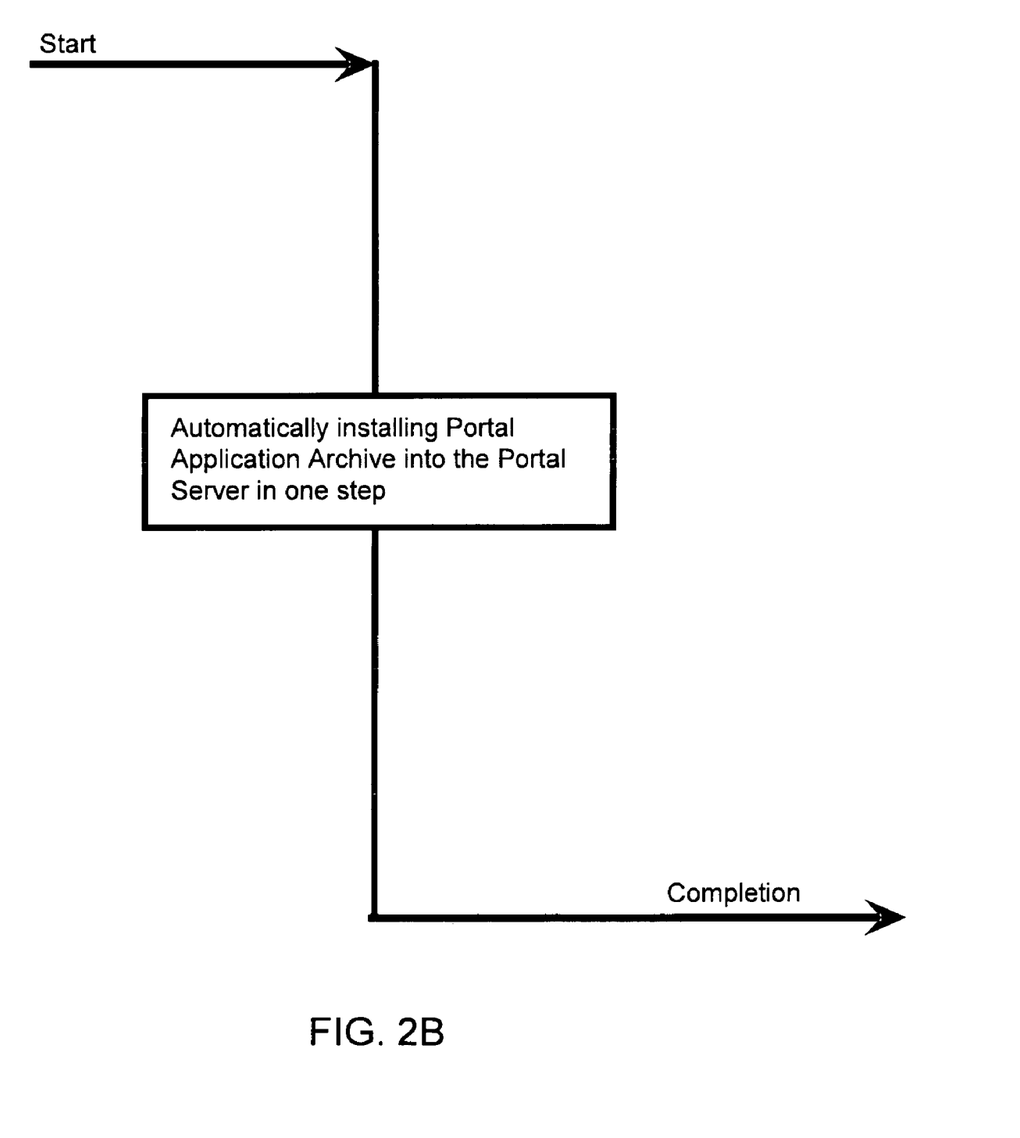
FIG. 2B shows the basic deployment process of a Portal Application into a Portal Server according to the present invention.

FIG. 2B shows the basic deployment process of a Portal Application as shown in FIG. 1A according to the present invention.

The present invention makes all prior art deployment steps obsolete. The entire Portal Application which is represented by the Portal Application Archive 35 is installed automatically in one step. The meta information included in the application component assembly descriptor 40 being part of the Portal Application Archive 35 can be evaluated by the Portal Server Application deployment mechanism. Based on that information the necessary deployment steps can be triggered automatically. The Portal Server Application configuration can be manipulated to reflect the desired layout and interaction of the provided application components. The inventive deployment process is shown in more detail in FIG. 3D.

Figure 3A:
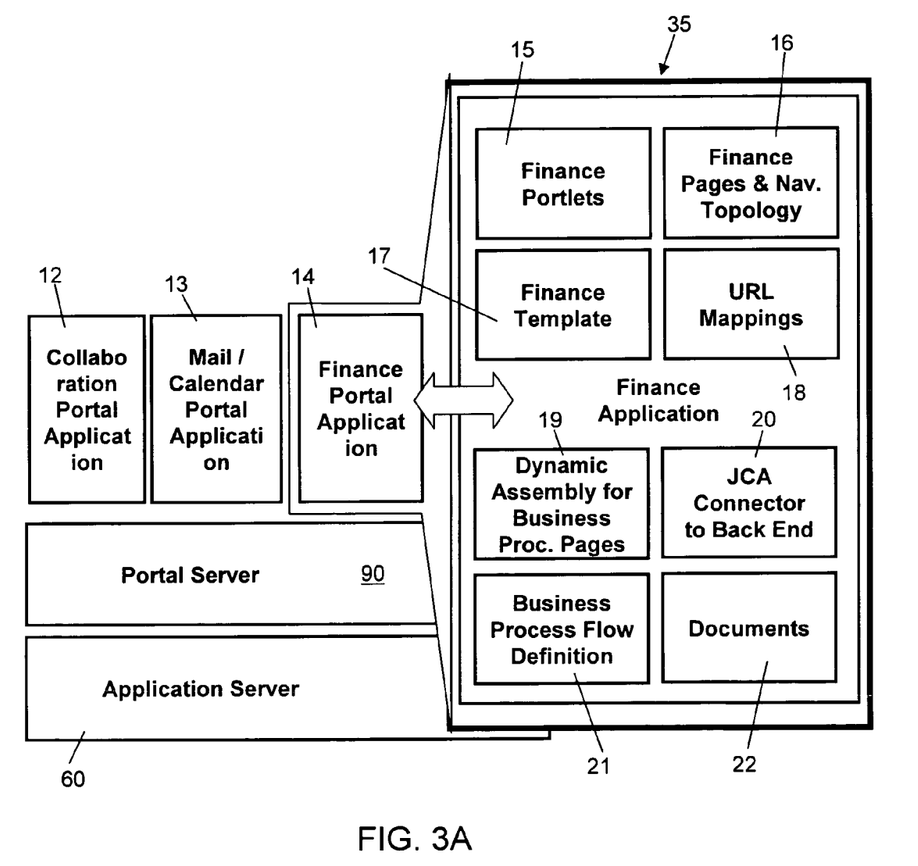
FIG. 3A shows an example of a Portal Application that is developed and deployed by the present invention.

FIG. 3A shows an example of a complex Portal Application developed by means of a Tooling Software and deployed by a deployment mechanism of the Portal Server Application according to the present invention.

FIG. 3A shows an example with three different Portal applications: collaboration 12, mail/calendar 13, and finance 14. The finance portal application 14 includes a set of business process definitions 21, JCA connectors 20 to a backend system, documents 22 describing the application for users, page definitions 16, URL mappings 18 and templates 17. The Portal Applications pages are made available in the Portal Server Application under the URLs defined in the URL mappings 18. The contained dynamic assembly module 19 for business process pages fills in dynamic pages in a placeholder node in the Pages & Navigation Topology, depending on the current state of business processes defined in the business process definitions. The contained application Portlets 15 allow the creating and processing of new process instances. They can display the contained documents for help or use the contained connectors to access backend systems. Some of the contained Portlets are for administration of the Portal Application.

Within a Portal Application, based on its type, many application components reference other application components. For example, a node in a Topology tree can reference the definition of a Page, a node in a Resource tree can reference a Theme definition, the definition of a Page can reference one or more Portlets, etc.

In order to develop and deploy such a Portal Application according to the present application new function components have to be added to the existing prior art Tooling Software and to Portal Server 90/Application Server 60 as follows:

the Tooling Software 30 (e.g., IBM Websphere Studio) needs to be able to support the notion of Portal Applications, which can be developed consistently and comprise multiple individual, but related application components internally, the Tooling Software 30 must be able to package and export comprehensive Portal Application Archives 35, which can be delivered by the application provider to the Portal Server Application. A key element is the application component assembly descriptor being preferably a XML file, which lists the content of the Portal Application and defines how the content is assembled to provide a Portal Application application. For example, in an J2EE environment, the package format of choice comprises J2EE EAR files, which include all related application components as well as the deployment descriptor XML file, the Portal Server 90 or the Application Server 60 on which the Portal Server 90 runs (e.g., IBM Websphere Portal) must be able to import Portal Application Archives 35 and must automatically deploy the included application components 15-22 as described in the application component assembly descriptor file 40. For example, this deployment into a running Portal Server Application environment 90 can be done by using the Application Server deployment. IBM WebSphere Portal Server 90 uses APIs in the Applications Server's 60 deployment process to properly handle all Portal specific application components while the base J2EE application components are handled by the Application Server. Different application components 15-22 in the Portal Application Archive 35 influence the different parts of the Portal Server 90. The deployed application components 15-22 plug into different Portal Server Application components, like the aggregation, the Portal configuration or the Portlet Container (not shown).

Figure 3B:
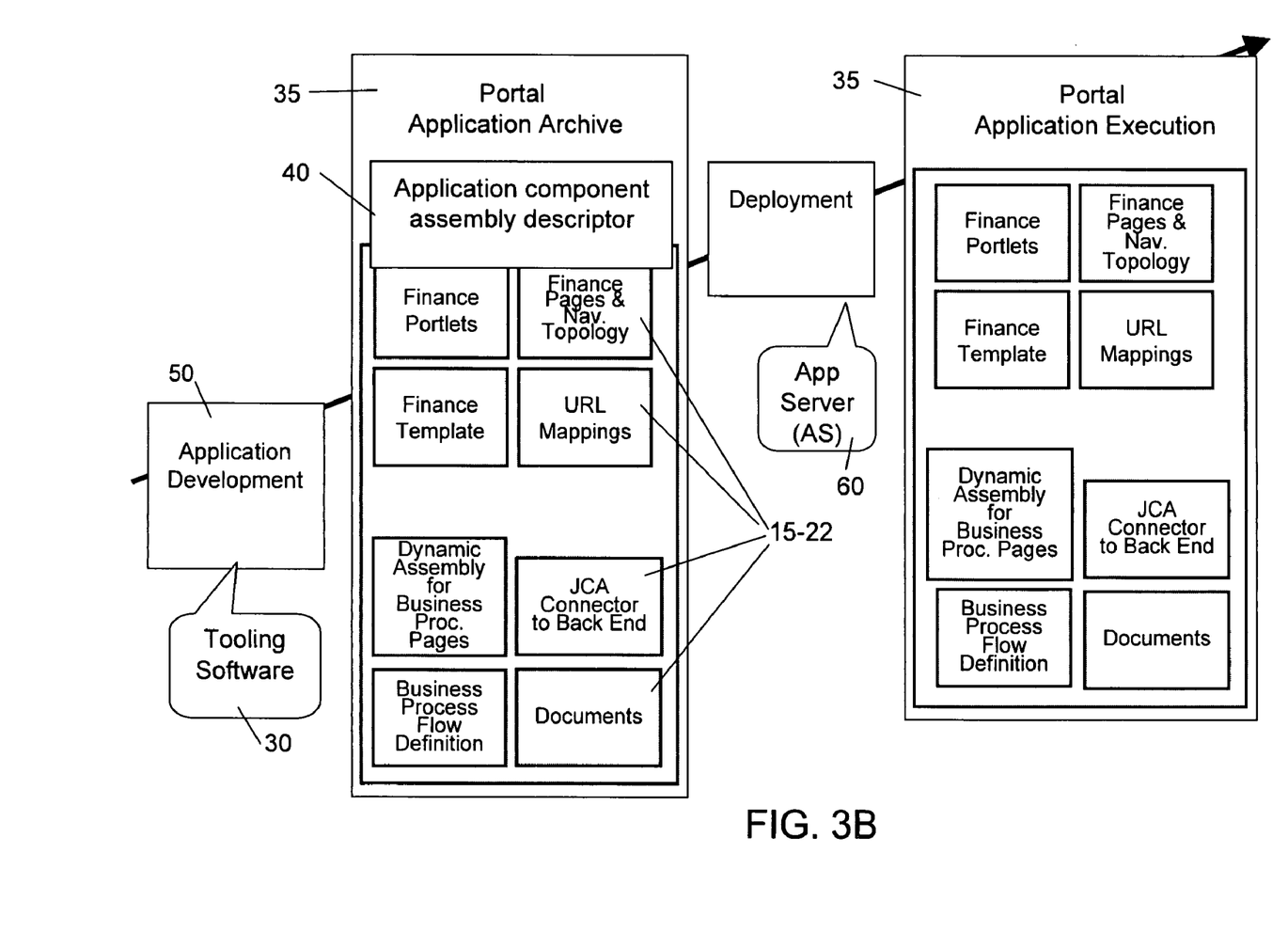
FIG. 3B shows an embodiment of the development and deployment process of a Portal Application as shown in FIG. 3A according to the present invention.

The overall Portal Application development and deployment process is shown in the FIG. 3B.

Portal Application Development Process

A Tooling Software 30 for Portal Application 50 must enhance the scope of a Portal Application according the present invention. Instead of developing individual Portlets, each project can include multiple application components 15-22, which can be developed independently as individual pieces of a Portal Application 50. In addition to existing tooling functionality, the relationship/interaction between different application components 15-22 of a complex Portal Application 50 needs to be programmable as well.

The Tooling Software 30 must also provide a layout editor (not shown), which allows defining of the layout of the Portal Application 50 and arranging its application components 15-22 as desired.

The developed application components 15-22 must be stored within the Tooling Software's internal repository as a unit (not shown). It is important to emphasize that it is not sufficient to only store the developed code of the individual application components 15-22. Additionally, the programmed relationship/interaction between the application components 15-22 as well as the defined layouts must also be stored together with the actual code. For that purpose, it is suggested that the Tooling Software 30 uses the application component assembly descriptor file 35 to define how the various application components 15-22 are assembled into a coherent Portal Application 50. The application component assembly descriptor file 35 provides meta information (e.g., in XML) that describes the Portal Application 50 and its topology. The file can be considered as the table of content of a Portal Application 50 and also describes how to assemble and arrange the application components 15-22. The structure and content of the application component assembly descriptor file 35 will be described in a more detail with respect to FIG. 4.

Figure 3C:
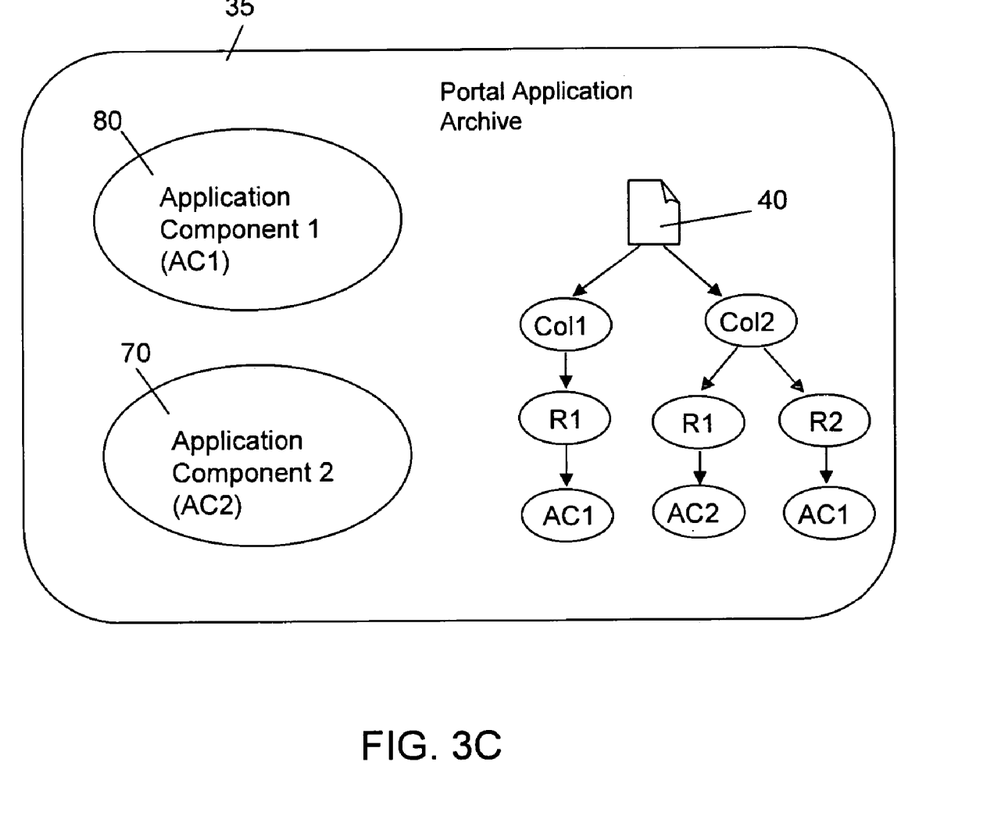
FIG. 3C shows the result of the inventive development process according to FIG. 3B.

FIG. 3C shows an example of the result of the inventive development process. The result of the development process is the inventive Portal Application Archive 35. In the present example the Portal Application Archive 35 is a single file package that includes two application components 70, 80 in machine-readable code as well an application component assembly descriptor 40 (e.g., XML file) specifying the correlation between both application components 70, 80. In the present example, the Portal Server Application deployment mechanism uses the application component assembly descriptor 40 and creates a new page with two columns. Column 1 contains a single row while column 2 contains two rows. Each of these rows contains one application component 70, 80.

Figure 3D:
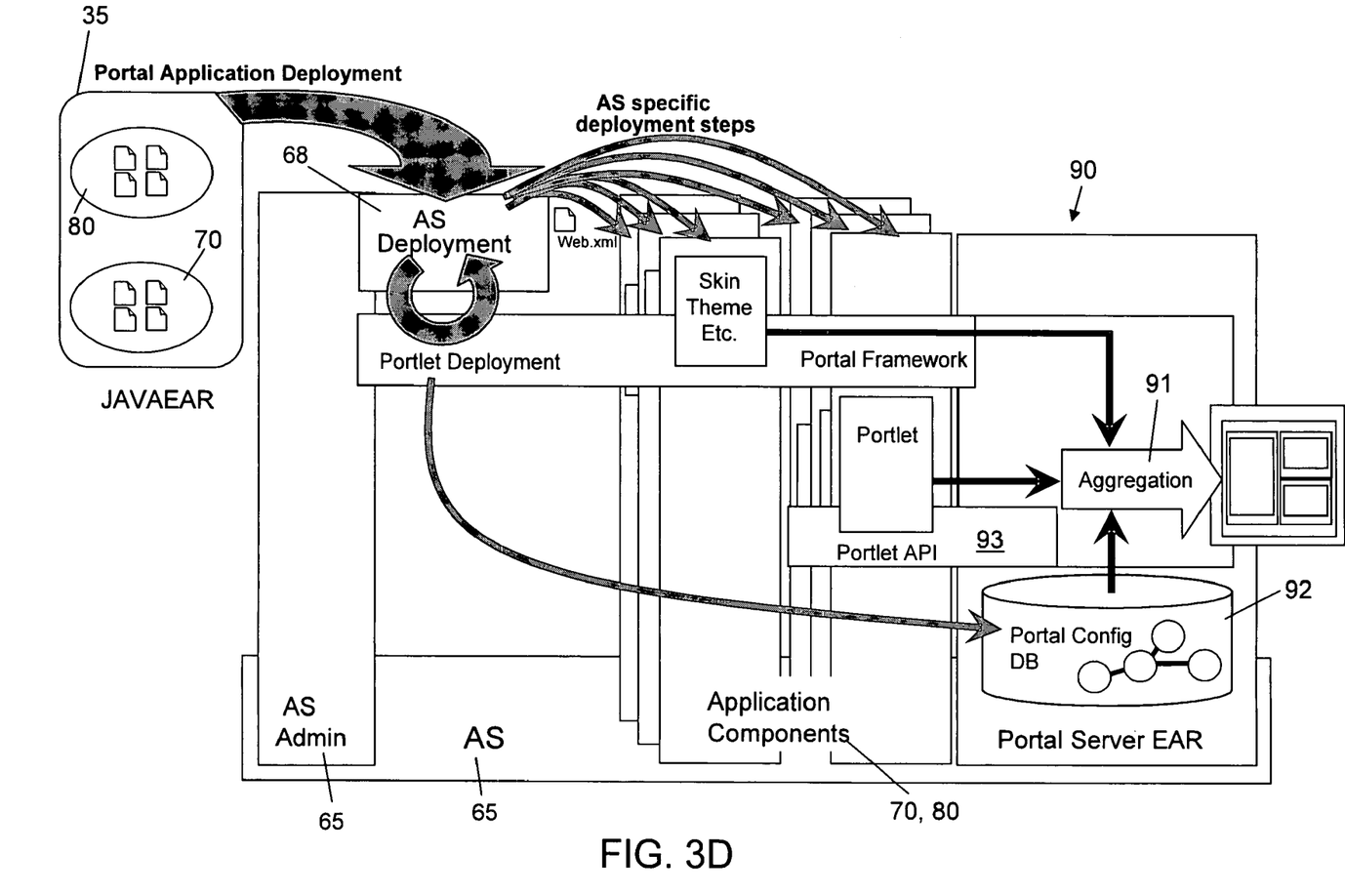
FIG. 3D shows an implementation of a deployment process in a Portal Server Application according to the present invention.

FIG. 3D shows a preferred implementation of the inventive deployment process in a Portal Server Application environment 90.

Portal Application Archives 35 can be deployed directly into the Portal's underlying Application Server 60 (AS) using its Application Server administration tools 65. Portal Server Application 90 uses the APIs in the Applications Server's deployment process 68 to properly handle all application components 70, 80. FIG. 3D shows how the different application components 70, 80 in the Portal Application Archive 35 influence the different parts 91, 92, 93 of the Portal Server Application 90. The application components 70, 80 plug into different Portal Server Application components, like the aggregation 91, the portal configuration 92 or the Portlet container 93.

Within a J2EE environment, Portal Application Archives 35 will be packaged as Java EAR files. As mentioned above, the Portal Application Archive 35 generated by the Portal Tooling Software 30 (or manually) will be compliant to the J2EE specification and provide all necessary information required by the standard.

Therefore the EAR (i.e., Portal Application Archive 35) can be deployed on any J2EE compliant Application Server 60. Nevertheless a standard Application Server 60 (AS) would ignore the additional information such as the XML application component assembly descriptor file 40 and would not be able to determine how to assemble the various application components 70, 80 to the desired Portal Application properly. For this purpose additional deployment logic (AS Deployment 68) needs to be provided into the Application Server 60. This is described below.

The controller of the existing Application Server Deployment API (known as AppDeploymentController) accepts an arbitrary J2EE EAR file as input, performs basic validation for J2EE specification compliance and then creates a sequence of tasks that need to be performed for deployment of the given EAR. The sequence of tasks can be extended programmatically to perform additional specific deployment logic. Such an additional task will be used to evaluate the application component assembly descriptor 40 and perform the necessary steps to deploy Portal Applications.

The AppDeploymentController instance is used by administrative clients that provide application installation capability to the Portal Server Application 90. It reads an EAR file and creates a sequence of AppDeploymentTasks which specify the data that needs to be collected from the end-user in order to install the EAR file.

The controller class has the following APIs among others—

```
class AppDevelopmentController
{
...
public String[ ] getAppDeploymentTaskNames( );
public AppDeploymentTask getFirstTask ( );
public AppDeploymentTask getNextTask ( );
public AppDeploymentTask getTaskByName (String taskName);
}
```

The APIs of AppDeploymentController class are documented by AS 60.

According to the AS 60 specification, a client application needs to 1) create an instance of AppDeploymentController using AppManagementFactory and passing in an EAR file
2) iterate over the tasks created by AppDeploymentController by calling getFirst and getNext methods
3) present the task data to the end-user and collects necessary data input by the user
4) set the data back into the tasks and saves the AppDeploymentController instance
5) call getAppDeploymentSavedResults API on the controller to get options, and calls installApplicationAPI on AppManagement MBean passing in the EAR file and the options.

To deploy the Portal specific enhancements provided by the EAR (i.e., Portal Application Archive 35), Portal Server 90 needs to implement its own Task Provider. Portal Server 90 uses API(s) in the Applications Server's deployment process 60 to properly handle all Portal specific application components while the base J2EE application components are handled by the Application Server 60. The Portal specific task provider can integrate additional deployment steps by implementing the interface AppDeploymentTaskProvider.

```
package com.ibm.websphere.management.application
public class AppManagementExtensions {
/**
* This interface is implemented by the task providers that want
to add
* extra tasks to the app deployment (preparation of ear file)
process
* on the client side.
*/
public interface AppDeploymentTaskProvider {
    /**
    * Manipulates the list of task info objects that are used
during
    * creation of AppDeploymentController instance. The vector
contains a
    * set of default tasks to begin with.
    * @param taskInfo Vector that contains the task info
objects
    * @param deploymentInfo The AppDeploymentInfo instance that
contains
    * information about the archive being deployed
    * @param prefs The preferences where you can specify
locale,
    * default binding info, etc.
    */
    public void provideClientDeploymentTasks (
        Vector taskInfo,
        AppDeploymentInfo deploymentInfo,
        Hashtable prefs)
        throws AppDeploymentException;
```

Based on the information in the application component assembly descriptor XML file 40, Portal specific tasks are invoked to register the application components 70, 80 within the Portal Server Application 90 and perform the necessary Portal setup and administration steps automatically. The different application components 70, 80 in the Portal Application Archive 35 influence the different parts of the Portal Server Application 90. The application components 70, 80 plug into different Portal Server Application 90 components, like the aggregation, the portal configuration or the Portlet container.

The Portal specific tasks which are added include:
Instantiate Portlets;
Resolve external references;
Apply Themes/Skins;
Add pages to the page hierarchy;
Define Page Layout;
Setup access control settings/map users to roles; and
Connect Portlets using Click 2 Action wiring Usage of Portlets within Portal Applications.

Portlets, along with Pages are the basic building blocks of Portal Applications—they provide the sub-units of user experience that are then aggregated by the Portal Application to provide the final user experience. Portlets are packaged into Portal Applications. Portal Applications are similar to J2EE web applications, except they make use of additional interfaces that make it easier to aggregate Portlets onto a single Page, as well as re-use Portlet applications and individual Portlets on many Pages within a Portal Application or Portal site. The packaging format of Portlet applications is the Web Archive (WAR) format that besides the web.xml deployment descriptor includes the Portlet.xml deployment descriptor that defines the Portlet relevant parts of the web application.

A single Portlet produces the content of one Portlet window. In order to leverage the flexibility that Portlets can be used as building blocks, Portlet application developers should strive for small Portlets that contain a specific function instead of one large Portlet that includes all functions. This has several advantages:

the portal end-user can decide to only put the needed parts on the page and save space that otherwise would be occupied by the parts not needed the different functions can be split across portal pages to suit the working behaviour of the user or to adapt to limited device display capabilities additional functions can later simply be added as new Portlets Portlets that belong to the same logical application should be bundled together in a Portlet application as this has several advantages, like the ability to share configuration data, session data, and ease of deployment and administration over the approach of one Portlet per Portlet application.

However, Portlet applications are currently very limited as they only deal with the Portlet part and do not allow to preassemble complete Portal Applications like the described invention. They miss the navigation and layout parts that are needed in order to provide useful portal applications.

Figure 4:
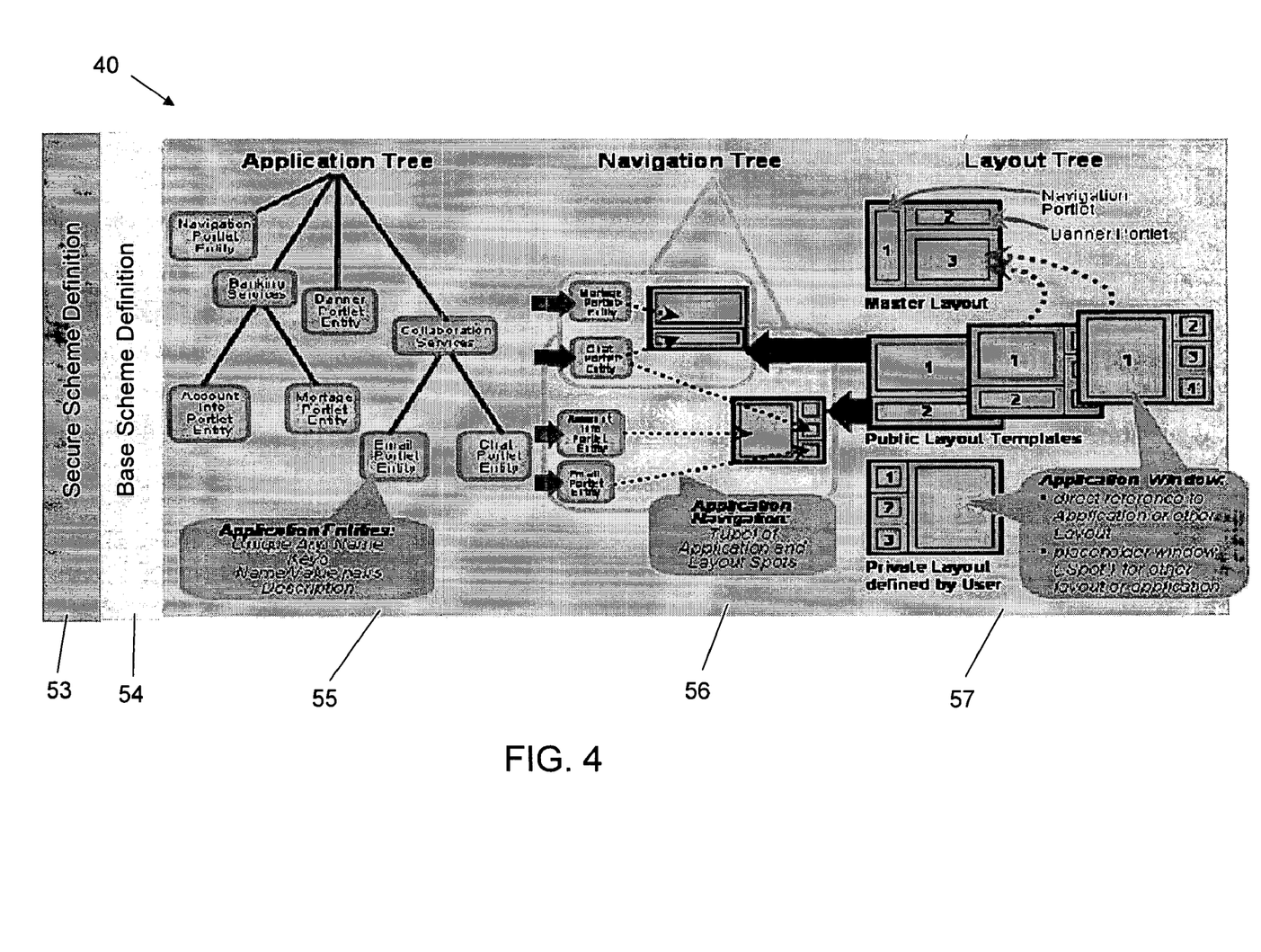
FIG. 4 shows an example of the content of an application component assembly descriptor which is part of the inventive Portal Archive.

FIG. 4 shows an example of an application component assembly descriptor file resulting from the inventive development process of a Portal Application.

The application component assembly descriptor file 40 is preferably based on several XSD Schema definitions:

Base Schema Definition 54
Describes the basic elements, which are used in the other schema definitions below, Topology Schema Definition
Describes all resources (J2EE references) and the application topology, including the layout, i.e., Page layout 57, navigation trees 56, Portlets 55, Security Schema Definition 53
Describes security related aspects, such as application roles and their access control rights.

Base Schema Definition 54
The base schema definition specifies basic elements which are used in the other two schema definitions. These elements include:

Title:
A friendly name of an entity to be exposed to the programmer or user.
Description:
The description element provides a NLS-enabled text
Parameter:
A set of name/value pairs which allow to attaché customized attributes to an entity
nlsRef:
A reference to a file, which can map localized strings.
Version String:
An identifier to specify the version of an entity
The Topology description schema comprises three parallel trees 55, 56, 57 which are linked to each other:
  The application tree lists and describes all application components, which are used by the Portal Application. Application components can be specified in a hierarchical order in that tree 55.
  The layout tree defines the layouts which can be used by the Portal Application 57. Layouts can be included in other layouts. Layouts specify windows in which application components can be inserted.
  The navigation tree defines the navigation hierarchy which the application exposes 56. This is done by defining navigation elements, which map the given application components to particular window in the available layouts.
The following list details the elements which are defined in the Topology Schema Definition:
Topology Description 55, 56, 57:
  This is the root element of the topology description. It includes the application title, description, version, unique name, and its prerequisites. This element also references the application tree, layout tree as well as the navigation elements which combine application components and layouts.
Application Tree 55
  This is the root Element of Application Tree, which describes all application components.
  This element provides a title, description and unique name. An application tree can reference other sub-application trees or directly one or more application elements.
ApplicationElement
  The application element describes an application component with its properties. Besides title, description and unique name, a resource-link element references the binary code (e.g., a WAR file). Parameter name/value pairs can be used to provide application specific information.
Application Component Type
  This type lists all possible application element types:
    Portletdefinition
    Portletentity
    wire
    Portletservice
    service
    skin
    theme
    label
    urlLink
    tile
    any
Resource Link
  This element references the actually binary code of an application component (e.g., a WAR file). UID and URL are used for referencing. There are two link types, which can be applied:
    Static
    dynamic
Layout Tree 57
  This is the root element of Layout Tree, which describes all available layout templates. The layout tree element provides a title, description and can reference other layout trees or directly a particular layout element.
Layout Element
  The layout element describes a Layout Template. Besides title, description, parameters, unique Name and a keyword, the layout element includes a container in which content can be placed.
Container
  The container element can include several containers itself, or it can be used to place actual content into a layout.
  Unique name, title, description and parameters are additional information documented in the container element. The following container types are possible: row
    Column
    Grid
    Window
  Title, description, and parameters are used within the Window element.
  A window is the Placeholder into which actual content can be placed into a layout: such content can be either:
    A reference to another layout element, which is embedded into the window of the given layout element
    A static reference to an application entity which is placed into the window as part of the layout definition.
    An empty spot, indicating that this window is free to be used by a navigation element using the given layout element. Each navigation element using this layout element can specify individually which application entity should be placed into this spot.
Navigation Element 56
  Navigation elements are nested and resemble the navigation tree, which the application exposes to the user. Each navigation tree can have one or more sub navigation elements. The referenced navigation content within the navigation element specifies how content is placed into the used layouts.
  The layout element as well as Title, description, and parameters are specified within the Navigation element
Navigation Content
  The navigation content is used by the navigation element to map content (application entities) into a particular layout. For this purpose a particular application entity and a corresponding window within the given layout are referenced. The application entity will show up in that layout window, when the Portal Application is displayed.

The invention claimed is:

1. A method for automatically deploying a Portal Application into a Portal Server Application environment, wherein the Portal Application is provided to the Portal Server Application environment as a Portal Application Archive which includes all application components in machine-readable code for forming the Portal Application, wherein the all application components include portlets, each portlet containing a specific function, and the Portal Application Archive also includes an application component assembly descriptor in machine-readable code which specifies how the application components need to be assembled to provide the Portal Application on the Portal Server Application environment, the method comprising:
  providing the Portal Application Archive to a deployment mechanism within the Portal Server Application environment which is able to directly deploy the Portal Application Archive into the Portal Server Application environment by using the deployment mechanism's Application Program Interfaces (APIs) to properly handle the all application components, evaluating the application component assembly descriptor included in the Portal Application Archive by means of the deployment mechanism to determine a desired layout of how the application components need to be assembled and interaction information of all the application components, wherein the application component assembly descriptor includes a topology schema definition, the topology schema definition including an application tree that lists and describes all application components, a layout tree that defines the desired layout by defining which windows application components are inserted into, and a navigation tree that defines navigation elements that map the application components to a particular window in the desired layout, and automatically deploying the application components into respective parts of the Portal Server Application environment according to the desired layout and interaction information included in the application component assembly descriptor.

2. The method according to claim 1, wherein the application component assembly descriptor is a XML descriptor file.

3. The method according to claim 1, wherein the application component assembly descriptor further includes base schema definitions and security schema definitions.

4. The method according to claim 1, wherein the Portal Application Archive is provided as a Java EAR file, a set of correlated files, or database record.

5. The method according to claim 1, wherein the deployment mechanism is controlled by the Application Server on which the Portal Server Application runs.

6. The method according to claim 1, wherein the deployment mechanism is configured to instantiate application components, resolve external references, apply themes/skins, add pages to a page hierarchy, define page layout, set up access control settings, map users roles, and connect application components.

7. A computer program product stored on a computer usable medium, comprising computer readable program means for causing a computer to perform the method according to claim 1.

8. Tooling Software for developing a Portal Application stored on at least one computer useable medium, the Tooling Software comprising:

means for developing single application components, wherein the single application components include portlets, each portlets containing a specific function, means for developing an application component assembly descriptor which specifies a desired layout how the single application components need to be assembled and includes interaction information of the single application components to provide the Portal Application on the Portal Server Application environment, wherein the application component assembly descriptor includes a topology schema definition, the topology schema definition including an application tree that lists and describes all the single application components, a layout tree that defines the desired layout by defining which windows application components are inserted into, and a navigation tree that defines navigation elements that map the application components to a particular window in the desired layout, means for storing the single application components and the application component assembly descriptor together as a Portal Application Archive into a repository, and means for providing the Portal Application Archive to a deploying mechanism of the Portal Server environment for automatically deploying the application components directly into respective parts of the Portal Server Application environment by using the deploying mechanism's Application Program Interfaces (APIs) to properly handle the single application components according to the desired layout and interaction information included in the application component assembly descriptor.

9. Tooling Software according to claim 8, wherein the Portal Application Archive is provided to the Portal Application environment as a packaged single file, a packaged subset of correlated files, or in a database record.

10. Tooling Software according to claim 9, wherein the single file is a Java EAR file.

11. A method of deploying a Portal Application on a Portal Server, the method comprising:

providing the Portal Application as a Portal Application Archive to a Portal Server Application environment including the Portal Server, wherein the Portal Application Archive includes all application components in machine-readable code for forming the Portal Application, wherein the all application components include portlets, each portlet containing a specific function, and an application component assembly descriptor in machine-readable code which specifies a desired layout of how the application components need to be assembled and includes interaction information of the application components to provide the Portal Application on the Portal Server Application environment, wherein the application component assembly descriptor includes a topology schema definition, the topology schema definition including an application tree that lists and describes all application components, a layout tree that defines the desired layout by defining which windows application components are inserted into, and a navigation tree that defines navigation elements that map the application components to a particular window in the desired layout; and means for automatically deploying the application components directly into respective parts of the Portal Server by using Application Program Interfaces (APIs) to properly handle the all application components according to the desired layout and interaction information included in the application component assembly descriptor.

12. The method according to claim 11, further including an Application Server on which the Portal Server Application environment runs, wherein the means for deploying the Portal Application is part of the Application Server.

* * * * *